H. SEIDERS.
POWER TRANSMISSION DEVICE.
APPLICATION FILED SEPT. 2, 1919.

1,400,185.

Patented Dec. 13, 1921.
2 SHEETS—SHEET 1.

Inventor.
Hiester Seiders.

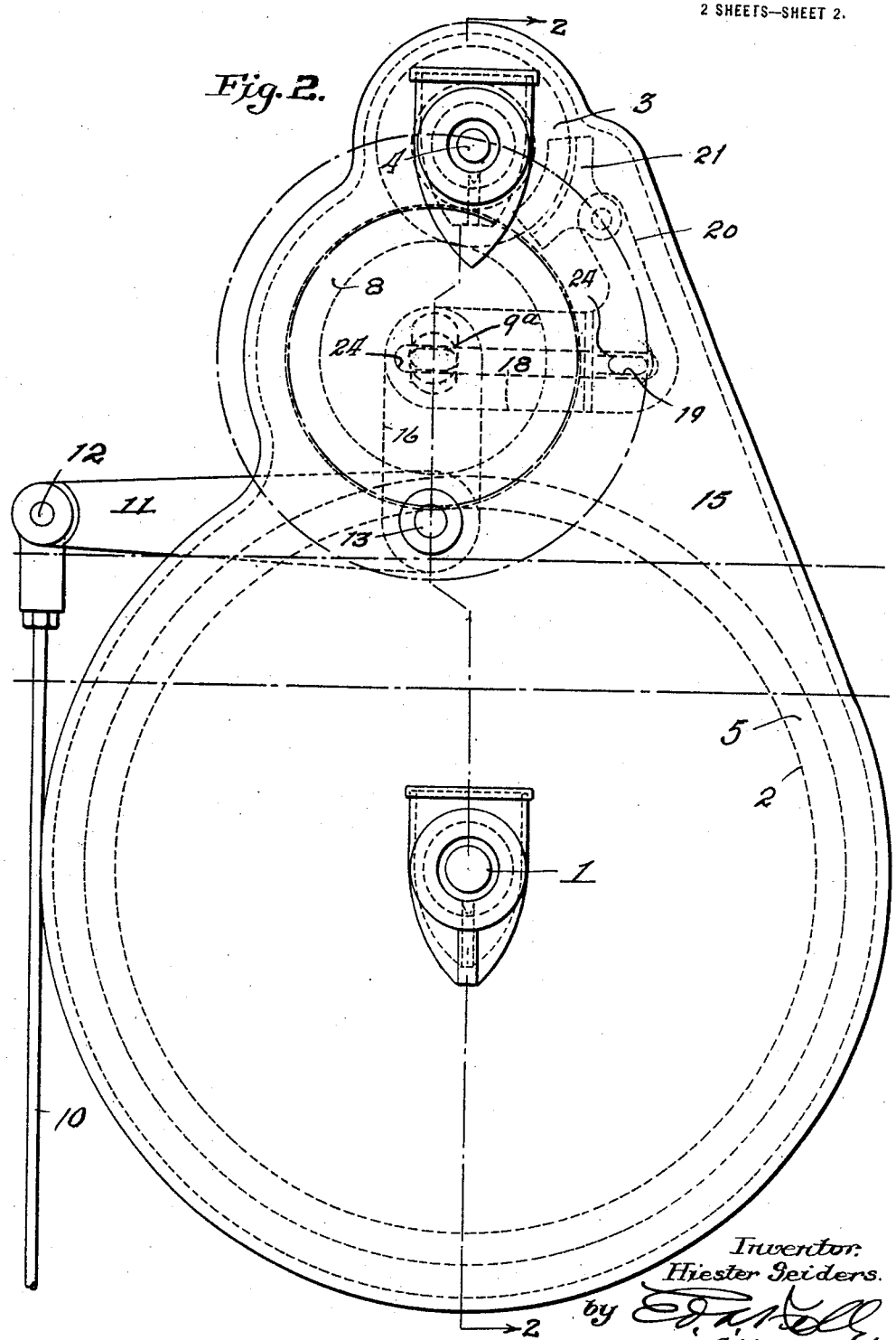

UNITED STATES PATENT OFFICE.

HEISTER SEIDERS, OF READING, PENNSYLVANIA.

POWER-TRANSMISSION DEVICE.

1,400,185.  Specification of Letters Patent.  Patented Dec. 13, 1921.

Application filed September 2, 1919. Serial No. 321,077.

*To all whom it may concern:*

Be it known that I, HEISTER SEIDERS, a citizen of the United States, residing at Reading, in the county of Berks and State of Pennsylvania, have invented certain new and useful Improvements in Power-Transmission Devices, of which the following is a specification.

This invention relates to improvements in power transmission devices and more particularly to that class of device used on power sewing machines.

The invention consists of a driving wheel, a driven wheel, and an intermediate wheel adapted to engage both the driving and driven wheel at the same time and to be disengaged from both of them at the same time.

A further object is to engage these wheels through a gripping action, so that the said engagement is made easily and smoothly, and without jar, but still effectively.

The invention is more fully described in the following specification and clearly illustrated in the accompanying drawings, in which:—

Figure 1:
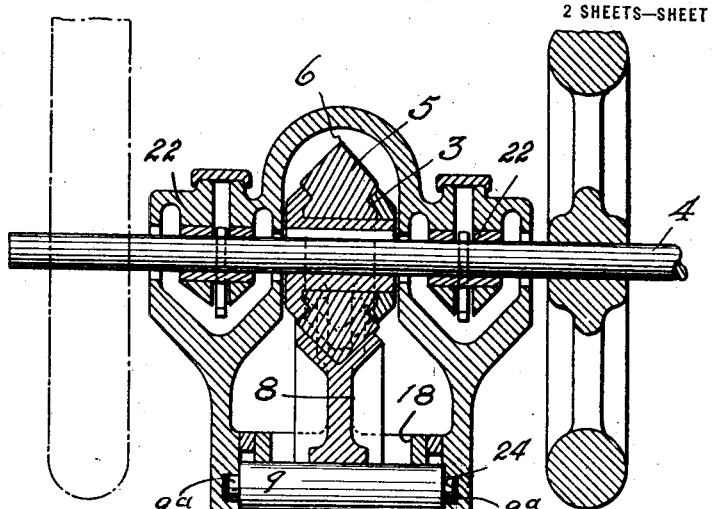
Figure 3:
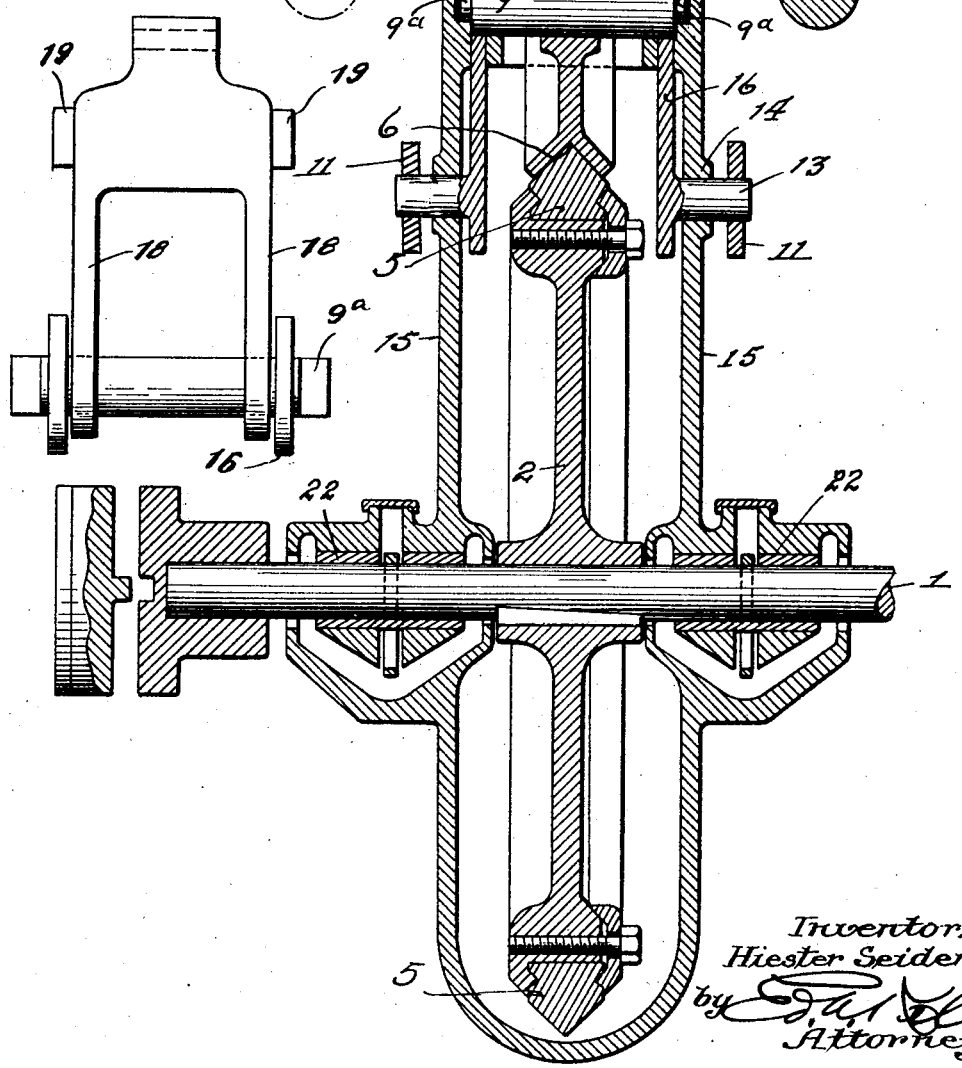

Figure 1 is a vertical, central sectional view of my mechanism, and Fig. 2 is a front elevational view showing the casing inclosing the entire device. Fig. 3 is a detail of the brake block arm, in plan view.

In the drawings, the numeral 1 designates the power shaft, on which is mounted the driving wheel 2.

The numeral 3 designates the driven wheel, which is mounted on a shaft 4, which may be connected in any suitable manner to operate a sewing machine or other mechanism.

Both the driving and the driven wheels are provided with tires 5, of fiber or like material, and these tires are formed with a double taper, that is, the extreme outer edge, 6, which is the center of the tire tread, is formed to a point.

The numeral 8 designates an intermediate wheel, formed with an approximately V-shaped groove in its outer edge, adapted to snugly engage the tapered tires on the wheels 2 and 3 when it is placed into engagement therewith.

This intermediate wheel 8 is rotatably mounted on a shaft 9 which shaft is formed with lugs 9ª at its ends and is adapted for movement laterally in the elongated slots 24 of the casing, so that it may be moved into or out of engagement with the wheels 2 and 3, to form a means of communicating or transmitting power from the wheel 2 to the wheel 3, and this engagement of the wheel 8 with the wheels 2 and 3, is accomplished with an easy, smooth gripping action, due to the contacting of the fiber surfaces of the wheels 2 and 3 with the metal groove surface of the wheel 8.

The numeral 10 designates an operating rod, the lower extremity of which may be provided with a foot pedal (not shown) such as is commonly used on sewing machines, and whereby the rod may be moved either up or down, depending on the movement of the foot pedal.

This rod has attached to its upper extremity, a pair of arms 11, by means of pivot pins 12, while the opposite ends of the arms 11 are mounted on studs 13, and the studs are mounted in bearings 14 in the side walls of the casing 15 which casing incloses the entire series of wheels and is provided for the purpose of containing a lubricant for the parts.

The studs 13 have formed thereon, links 16, the upper ends of which loosely engage the shaft 9 which carries the movable wheel 8.

On this shaft 9, between the sides of the wheel 8 and the ends of the links 16, is pivotally secured a jaw like brake block arm 18, having a lug 19 at each side, which lugs are adapted to slide in the elongated slots 24 in the casing wall. A brake shoe 21, adapted to engage the periphery of the wheel 3, is carried by the upper end 20 of this arm 18.

The entire mechanism, except the operating rod and its connected arms, is within the casing, and the shafts 1 and 4 are arranged to rotate in suitable bearings 22 therein, so that the casing may retain a lubricant for the operating parts.

It is evident therefore that when it is desired to transmit power from the driving wheel to the driven wheel the operator merely moves the operating rod 10 by foot pressure, which will move the intermediate wheel 8 into or out of engagement with the driving and driven wheels 2 and 3, and, by reason of the connection through the arms 11 and the links 16, this movement of the operating rod will cause the shaft 9 which carries the said wheel 8, to move laterally in the elongated slots 24 provided in the walls of the casing, as the links turn on the pivot points or studs 13.

This movement of the upper ends of the links 16 will also cause the brake block arm 18 to slide on its lugs 19 in the elongated slots 24, which will cause the brake shoe 21 carried on the arm, to move toward and away from the wheel 3, thus applying and releasing the brake. This application of the brake is arranged to coincide with the release of the intermediate wheel 8 from its engagement with the driving and driven wheels.

It will therefor be understood that when the operator moves the rod in one direction the intermediate wheel 8 will engage, by means of a gripping action, the outer surfaces of the driving and the driven wheels at the same time, and that the action is an easy one and may be made as slowly as the operator desires. And, that when the operator releases the intermediate wheel from this engagement, the release thereof and the application of the brake to the driven wheel is accomplished at the same time, so that there will be no lost time in stopping or starting the machine.

It is understood that the device may be applied to any machine in which power is to be transmitted, and especially where this transmission is desired intermittently.

It is also understood that the details of construction may be varied without departing from the spirit of my invention.

What I claim and desire to secure by Letters Patent is:—

In a device of the character described, the combination of a casing, a driving wheel and a driven wheel rotatably mounted in the casing, an intermediate wheel, a shaft therefor, said casing having elongated slots in which said shaft may move longitudinally, a pair of links loosely engaging said shaft at one of their ends and having studs formed on their opposite ends, said studs being mounted in bearings in the casing and projecting beyond the outer surfaces of the casing, arms mounted on the outer ends of said studs, an operating rod pivotally engaging the other ends of said arms, a jaw-like rock arm secured to said shaft between the sides of the intermediate wheel and the links, said rock arm being pivoted to the casing, and a brake shoe carried by the free end of the rock arm, said brake shoe being adapted for engagement with the driven wheel when the intermediate wheel is disengaged from contact therewith.

In testimony whereof I affix my signature.

HEISTER SEIDERS.